United States Patent
Chen et al.

(10) Patent No.: US 12,506,357 B2
(45) Date of Patent: Dec. 23, 2025

(54) POWER SOURCE AUTOMATIC TRANSFER DEVICE

(71) Applicant: Schneider Electric Industries SAS, Rueil Malmaison (FR)

(72) Inventors: Jiamin Chen, Shanghai (CN); Haijun Zhao, Shanghai (CN); Ying Shi, Shanghai (CN); Xiaohang Chen, Shanghai (CN); Fenglian Zhang, Shanghai (CN); Qing Yang, Shanghai (CN); Yangfeng Song, Shanghai (CN); Jihua Dong, Shanghai (CN); Yuxia Li, Shanghai (CN); Kunpeng Zhang, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 18/564,279

(22) PCT Filed: Jun. 30, 2023

(86) PCT No.: PCT/CN2023/104605
§ 371 (c)(1),
(2) Date: Nov. 27, 2023

(87) PCT Pub. No.: WO2024/002336
PCT Pub. Date: Jan. 4, 2024

(65) Prior Publication Data
US 2025/0167587 A1    May 22, 2025

(30) Foreign Application Priority Data

Jun. 30, 2022 (CN) .......................... 202210772320.3

(51) Int. Cl.
H02J 9/06          (2006.01)

(52) U.S. Cl.
CPC ............... *H02J 9/068* (2020.01); *H02J 9/062* (2013.01)

(58) Field of Classification Search
CPC ................................. H02J 9/068; H02J 9/062
See application file for complete search history.

(56) References Cited

U.S. PATENT DOCUMENTS 3,526,778 A     9/1970   Crocker et al.
11,211,816 B1  12/2021   Bose et al.
(Continued)

FOREIGN PATENT DOCUMENTS

CN      1881743 B     5/2010
CN     203522316 U    4/2014
(Continued)

OTHER PUBLICATIONS

International Search Report and Written Opinion mailed Sep. 27, 2023 in PCT/CN2023/104605, 8 pages.
(Continued)

*Primary Examiner* — Daniel Cavallari
(74) *Attorney, Agent, or Firm* — Wolf, Greenfield & Sacks, P.C.

(57) ABSTRACT

A power source automatic transfer device is provided, including: a first and second power source input end; an auxiliary power supply unit whose electric energy is acquired from a first and second power source; a device output end connected to a load; and a power source switchover unit including a control unit and a power source switchover switch, the power source switchover switch including a first and second power source switchover switch, wherein a first input end of the first and second power source switchover switch are respectively connected to the first power source input end and the second power source input end, a second input end of the first and second power source
(Continued)

switchover switch are both connected to an output end of the auxiliary power supply unit, and an output end of the first and second power source switchover switch are connected with the device output end.

7 Claims, 3 Drawing Sheets

(56) References Cited

U.S. PATENT DOCUMENTS

| | | |
|---|---|---|
| 2003/0048004 A1 | 3/2003 | Fleming et al. |
| 2003/0048005 A1 | 3/2003 | Goldin et al. |
| 2006/0226706 A1 | 10/2006 | Edelen et al. |
| 2009/0072623 A1 | 3/2009 | Liao |
| 2013/0106190 A1 | 5/2013 | Lin et al. |
| 2017/0317525 A1 | 11/2017 | Navarro et al. |
| 2020/0014239 A1 | 1/2020 | Liu |
| 2021/0249898 A1 | 8/2021 | Schecter et al. |
| 2021/0305840 A1 | 9/2021 | Wu et al. |

FOREIGN PATENT DOCUMENTS

| | | | |
|---|---|---|---|
| CN | 104539042 A | 4/2015 | |
| CN | 204349572 U | 5/2015 | |
| CN | 105024450 A | 11/2015 | |
| CN | 106410951 A | 2/2017 | |
| CN | 107508457 A | 12/2017 | |
| CN | 106410951 B * | 9/2018 | ............. H02J 9/061 |
| CN | 108808834 A | 11/2018 | |
| CN | 109412259 A | 3/2019 | |
| CN | 109461609 A | 3/2019 | |
| CN | 109672321 A | 4/2019 | |
| CN | 105024450 B | 11/2019 | |
| CN | 110601351 A | 12/2019 | |
| CN | 209844635 U | 12/2019 | |
| CN | 111009956 A | 4/2020 | |
| CN | 111082425 A | 4/2020 | |
| CN | 113644647 A | 11/2021 | |
| CN | 214626494 U | 11/2021 | |
| CN | 216016528 U | 3/2022 | |
| CN | 114430196 A | 5/2022 | |
| CN | 114513042 A | 5/2022 | |
| WO | 2018113704 A1 | 6/2018 | |
| WO | 2021197607 A1 | 10/2021 | |

OTHER PUBLICATIONS

International Search Report and Written Opinion dated Sep. 13, 2023 for International Patent Application No. PCT/CN2023/103254, 12 pages.
International Search Report and Written Opinion dated Sep. 14, 2023 for International Patent Application No. PCT/CN2023/103932, 12 pages.
International Search Report and Written Opinion dated Sep. 22, 2023 for International Patent Application No. PCT/CN2023/105027, 12 pages.
International Search Report and Written Opinion dated Oct. 13, 2023 for International Patent Application No. PCT/CN2023/103903, 13 pages.
Non-Final Office Action dated Dec. 18, 2024 from U.S. Appl. No. 18/563,303, 12 pages.
Extended European Search Report dated Feb. 13, 2025 for European Patent Application No. 23809940.2, 8 pages.
Extended European Search Report dated Mar. 17, 2025 for European Patent Application No. 23806158.4, 9 pages.
Extended European Search Report dated May 13, 2025 for European Patent Application No. 23806161.8, 7 pages.
Extended European Search Report dated May 16, 2025 for European Patent Application No. 23809075.7, 9 pages.
Non-Final Office Action dated Jul. 2, 2025 from U.S. Appl. No. 18/565,634, 33 pages.

* cited by examiner

POWER SOURCE AUTOMATIC TRANSFER DEVICE

CROSS-REFERENCE TO RELATED APPLICATIONS

This application is a 35 U.S.C. § 371 National Phase filing of International Application No. PCT/CN2023/104605, filed on Jun. 30, 2023, which claims priority to and the benefit of Chinese Patent Application No. 202210772320.3, filed on Jun. 30, 2022.

TECHNICAL FIELD

The present disclosure relates to a hybrid quick power source transfer switch and a transferring method thereof.

BACKGROUND

There are two routes of solutions for the existing quick Automatic Transfer Switch (ATS), i.e. solid-state solution and mechanical-electronic hybrid solution, but most solutions in the two routes have their relative limitations and shortcomings.

The solution in route 1 adopts a solid-state switching topology, which has a high product cost for the devices in the power loop; and generates too much heat, especially in high current applications.

The solution in route 2 adopts a mechanical-electronic hybrid topology, which mostly adopts a single mechanical switch; moreover in which, in order to pursue quick switchover, there are no two separate open/close positions for the switch, leading to the defects as follows:
(1) when a contact is switched, an arc discharge will occur not only to a single power source itself, but also between both power sources;
(2) there can be an output from an auxiliary power supply unit only during the switchover of the switch; leading to limits on the multi-selectivity of the methods for powering load.

Specifically, in the existing mechanical-electronic hybrid solutions, the auxiliary power supply unit, being subject to the single mechanical switch, can supply power to the load only during the switchover of the switch, so as to avoid short circuit between power sources. This not only wastes the capability of the auxiliary power supply unit, but also limits the multi-selectivity of the power supply source for the load.

Among the existing mechanical-electronic hybrid quick ATSs, a solution (CN105024450B) proposed by Changshu Switch Manufacturing Co., Ltd. is the most representative, with a structure diagram as shown in FIG. 1. It adopts a solution of single mechanical switch.

In this solution, the auxiliary power supply unit can supply power to the load temporarily only during the switchover, otherwise there will be short-circuit issue in the power grid. The power supply source for the load can only be selected between a power source 1 and a power source 2, thereby degrading the selectivity of the inverter output (e.g. UPS).

In addition, in order to reduce the time of arc and circular current in the power grid during the disconnecting of switch SW1 (as shown) from power source 1, the switchover of switch SW1 needs to be quick, therefore there are usually no two separate open/close positions for switch SW1. In this case, an arc discharge between power source 1 and power source 2 easily occur at the position of the contact during the switchover, affecting the service life of the contact.

In addition, Huawei's patent application provides an uninterruptible power supply system (CN104539042A), as shown in FIG. 2. The essence of this solution is a solution of a common ATS in general sense being connected with Uninterruptible Power Supply (UPS) in series. It has natural limitations in that: after a failure occurs in the first power source, the duration for the second power source to supply power to the load is limited; and the rectifier inverter unit operates online all the time, resulting in low efficiency and low long-term reliability.

SUMMARY

According to an embodiment of the present disclosure, there is provided a power source automatic transfer device, comprising: a first power source input end; a second power source input end; an auxiliary power supply unit whose electric energy is acquired from a first power source or a second power source; a device output end connected to a load; and a power source switchover unit including a control unit and a power source switchover switch, the power source switchover switch including a first power source switchover switch and a second power source switchover switch, wherein a first input end of the first power source switchover switch and a first input end of the second power source switchover switch are respectively connected to the first power source input end and the second power source input end, both a second input end of the first power source switchover switch and a second input end of the second power source switchover switch are connected to an output end of the auxiliary power supply unit, and an output end of the first power source switchover switch and an output end of the second power source switchover switch are connected with the device output end, wherein when the first power source operates normally, the first power source supplies power to the load; whereas when the first power source fails, the control unit controls the first power source switchover switch, the second power source switchover switch and the auxiliary power supply unit so as to transfer from supplying power to the load by the first power source to supplying power to the load by the second power source, and wherein during the transfer from the first power source to the second power source, the second power source supplies power to the load via the auxiliary power supply unit.

In an embodiment, when the fault of the first power source is eliminated, the control unit controls the first power source switchover switch, the second power source switchover switch and the auxiliary power supply unit so as to transfer from supplying power to the load by the second power source to supplying power to the load by the first power source, and wherein during the transfer from the second power source to the first power source, the first power source supplies power to the load via the auxiliary power supply unit.

In an embodiment, the control unit controls the first power source switchover switch, the second power source switchover switch and the auxiliary power supply unit so as to continuously supply power to the load by the first power source or the second power source via the auxiliary power supply unit.

In an embodiment, the auxiliary power supply unit includes a power selection switch, a rectifier unit and an inverter unit, and a control end of the auxiliary power supply unit is connected with the control unit, and wherein when the first power source supplies power to the load, the position of the power selection switch of the auxiliary power supply unit causes the auxiliary power supply unit to be connected with the second power source but disconnected from the first power source; however, when the second power source supplies power to the load, the position of the power selection switch of the auxiliary power supply unit causes the auxiliary power supply unit to be connected with the first power source but disconnected from the second power source.

In an embodiment, a control end of the first power source switchover switch and a control end of the second power source switchover switch are connected with the control unit, and wherein when the first power source fails, the control unit controls the first power source switchover switch to open its first input end connected with the first power source and close its second input end connected with the auxiliary power supply unit, and controls the second power source switchover switch to close its first output end connected with the second power source to cause the second power source to supply power to the load and disconnect its second input end connected with the auxiliary power supply unit, so that a transfer is made from supplying power to the load by the first power source to supplying power to the load by the second power source.

In an embodiment, when the fault of the first power source is eliminated, the control unit controls the second power source switchover switch to open its connection with the second power source and close its second input end connected with the auxiliary power supply unit, and controls the first power source switchover switch to close its first input end connected with the first power source to cause the first power source to supply power to the load and open its second input end connected with the auxiliary power supply unit, so that a transfer is made from supplying power to the load by the second power source to supplying power to the load by the first power source.

In an embodiment, the power supply automatic transfer device further includes a detection unit connected to the first power source input end and the second power source input end to detect the first power source and the second power source in real time so as to determine whether the first power source and the second power source fail.

In an embodiment, the first power source and the second power source are Alternating Current power sources.

In an embodiment, both the first power source switchover switch and the second power source switchover switch are double-pole double-throw switches.

BRIEF DESCRIPTION OF DRAWINGS

The aspects, features and advantages of the present disclosure will become clearer and easier to be understood, from the following description of the embodiments in conjunction with the accompanying drawings, in which.

DETAILED DESCRIPTION

Figure 1:
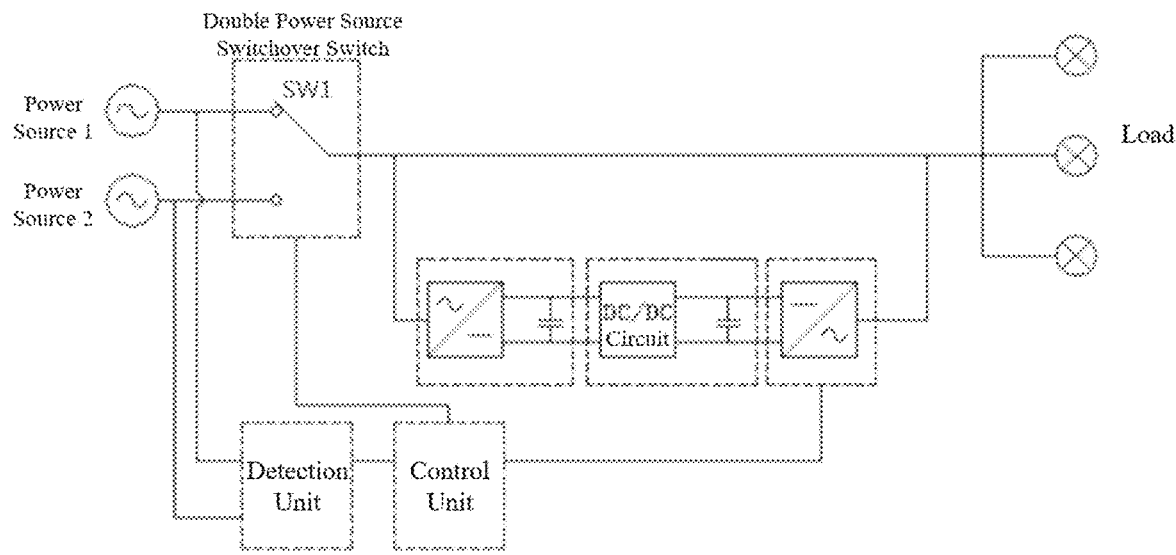
FIG. 1 shows a first solution of a quick ATS according to the existing art.
Figure 2:
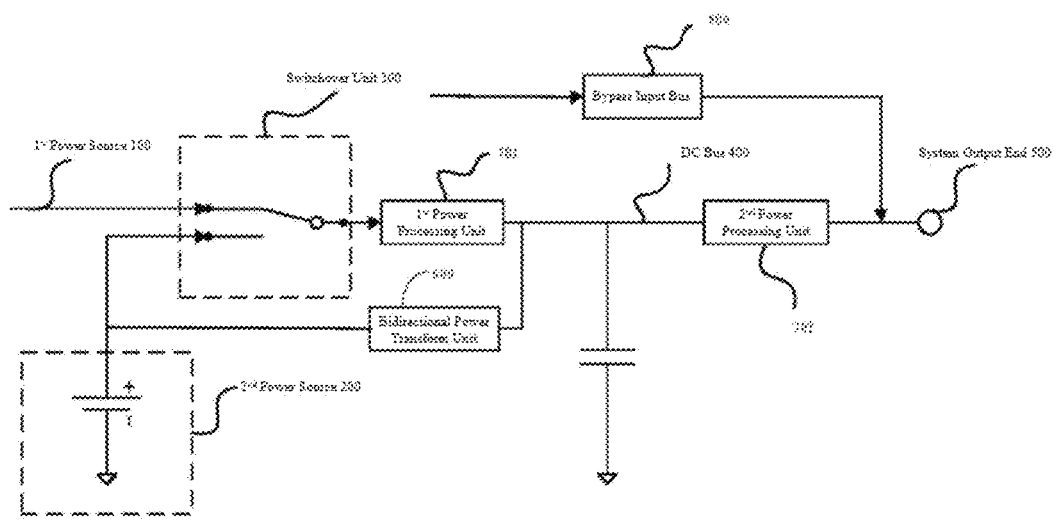
FIG. 2 shows a second solution of the quick ATS according to the existing art.

The present disclosure will be described in detail below with reference to the exemplary embodiments of the present disclosure. However, the present disclosure is not limited to the embodiments described herein, and it can be implemented in many different forms. The described embodiments are only used to make the present disclosure thorough and complete, and fully convey the concept of the present disclosure to those skilled in the art. Features of the described various embodiments can be combined or substituted with each other unless explicitly excluded or should be excluded according to the context.

There is provided an architecture solution for a quick ATS which is based on a mechanical plus electronic hybrid design. The main power supply loop uses a mechanical switch(es), which thus has a higher power transfer efficiency and a lower cost comparing to a solid-state solution. In addition, because of the use of two mechanical switches and a two-step switchover action, not only the method of supplying power to the load may be more selective, but also the quick and potential arc discharge between the two sources caused by the single switch may be reduced, and the service life of the contacts may be increased.

There is provided another mechanical and electronic hybrid solution, which is characterized by follows:
1. two mechanical switches to implement a switchover between two power sources S1/S2 in two steps;
2. multi-selectivity of power supply source for the load, that is, in addition to conventional S1/S2, clean power source of inverter output may be used;
3. simplified mechanical switch design, for which there is no need for the existence of two separate open/close positions inside the switch; and
4. no arc discharge issue between two power sources.

According to an embodiment of the present disclosure, a power source switchover device comprises: a first power source input end; a second power source input end; an auxiliary power supply unit whose electric energy is acquired from a first power source or a second power source; a device output end connected to a load; and a power source switchover unit including a control unit and a power source switchover switch, the power source switchover switch including a first power source switchover switch and a second power source switchover switch, wherein a first input end of the first power source switchover switch and a first input end of the second power source switchover switch are respectively connected to the first power source input end and the second power source input end, a second input end of the first power source switchover switch and a second input end of the second power source switchover switch are both connected to an output end of the auxiliary power supply unit, and an output end of the first power source switchover switch and an output end of the second power source switchover switch are connected with the device output end, wherein when the first power source operates normally, the first power source supplies power to the load; whereas when the first power source fails, the control unit controls the first power source switchover switch, the second power source switchover switch and the auxiliary power supply unit so as to transfer from supplying power to the load by the first power source to supplying power to the load by the second power source, and wherein during the transfer from the first power source to the second power source, the second power source supplies power to the load via the auxiliary power supply unit.

In an embodiment, one of the first power source and the second power source may be a main power source, and the other may be a backup power source. In a further embodiment, both the first power source and the second power source may be Alternating Current power sources.

Figure 3:
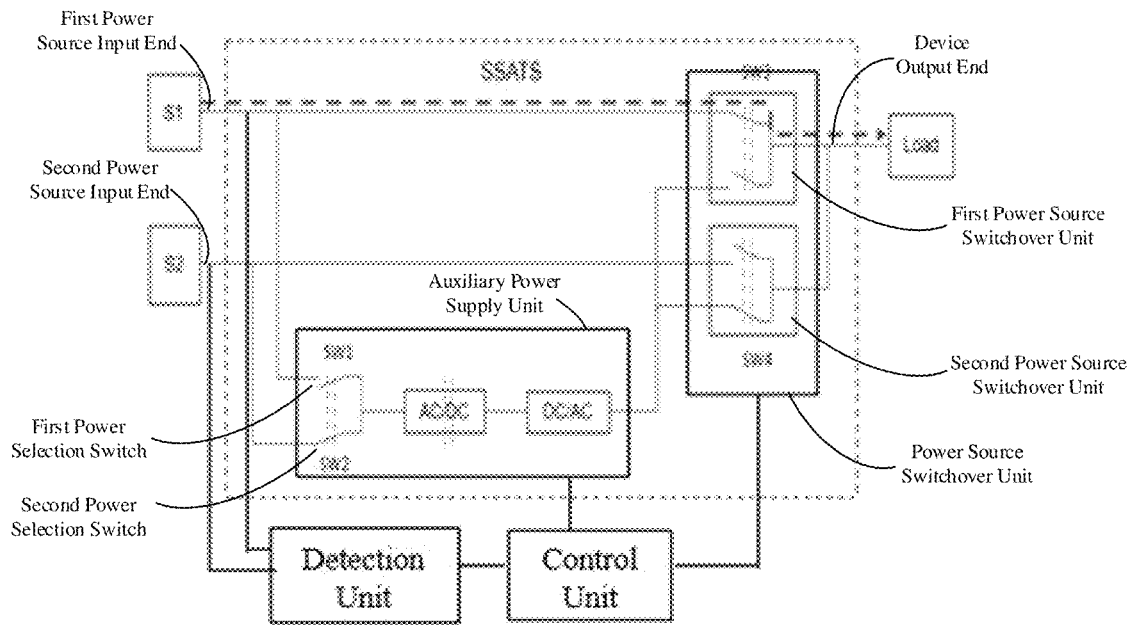
FIG. 3 shows a power source automatic transfer device according to an embodiment of the present disclosure.

FIG. 3 shows an example diagram of a power source switchover device according to an embodiment of the present disclosure.

In FIG. 3, the first power source and the second power source are shown as S1 and S2 respectively, and the first power source switchover switch and the second power source switchover switch are shown as SW3 and SW4 respectively. The power source switchover device in FIG. 3 is connected to a load LOAD to supply power to it. An auxiliary power supply unit is shown as including a rectifier unit, an inverter unit and a power selection switch, and a control end of the auxiliary power supply unit is connected with a control unit. The power selection switch of the auxiliary power supply unit may include a first power selection switch and a second power selection switch, shown as SW1 and SW2 in FIG. 3, which are respectively connected with a first power source input end and a second power source input end to control the on-off of the auxiliary power supply unit with the first power source and/or the second power source, so as to enable the auxiliary power supply unit to obtain electric energy from the first power source and/or the second power source.

In a further embodiment, the first power source switchover switch and the second power source switchover switch may be double-pole double-throw switches.

In a further embodiment, the power source switchover device according to the embodiment of the present disclosure may further include a detection unit, which may be connected to the first power source input end and the second power source input end to detect the first power source and the second power source in real time for determining whether the first power source and the second power source fail.

Figure 4:
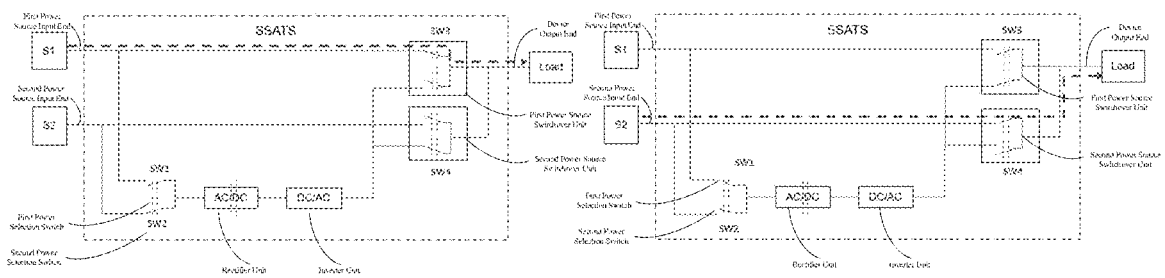
FIG. 4 shows operating modes of power source automatic transfer device in which power is provided respectively by two power sources according to an embodiment of the present disclosure.

The left diagram and the right diagram of FIG. 4 respectively show modes in which power is supplied to the load by the first power source S1 or the second power source S2 respectively.

When power is supplied to the load by the first power source S1, the states of various components of the power source switchover device are as shown in the left diagram in FIG. 4. Specifically: 1. The first input end of the first power source switchover switch SW3 connected with the first power source S1 is closed, that is, the first power source S1 can directly supply power to the load; 2. The first input end of the second power source switchover switch SW4 connected with the second power source S2 is opened, that is, the second power source S2 cannot supply power to the load; 3. At this time, the output of the auxiliary power supply unit is not enabled, as a result, although the second input end of the second power source switchover switch SW4 connected with the second power source S2 via the auxiliary power supply unit is closed, the path will not provide power to the load. It should be noted that, the path in which the second power source switchover switch SW4 is connected with the second power source S1 via the auxiliary power supply unit may be enabled and provides power to the load upon the switchover from supplying power by the first power source to supplying power by the second power source. Meanwhile, the first power selection switch SW1 of the auxiliary power supply unit is opened, whereas the second power selection switch SW2 is closed. Since the output of the auxiliary power supply unit is not enabled, although the second power selection switch SW2 is closed, the path will not provide power to the load. In an embodiment, whether the output of the auxiliary power supply unit is enabled or not may be controlled by a controller inside the rectifier room.

When power is supplied to the load by the second power source S1, the states of various components of the power source switchover device are as shown in the right diagram in FIG. 4. Specifically: 1. The first input end of the first power source switchover switch SW3 connected with the first power source S1 is opened, that is, the first power source S1 cannot directly supply power to the load; 2. The first input end of the second power source switchover switch SW4 connected with the second power source is closed, that is, the second power source S2 supplies power to the load; 3. At this time, the output of the auxiliary power supply unit is not enabled, as a result, although the second input end of SW3 connected with the auxiliary power supply unit is closed, the path will not provide power to the load. It should be noted that, the path in which the first power source switchover switch SW3 is connected with the first power source S1 via the auxiliary power supply unit may be enabled upon the switchover from supplying power by the second power source to supplying power by the first power source, and provide power to the load. Meanwhile, the first power selection switch SW1 of the auxiliary power supply unit is closed, whereas the second power selection switch SW2 is opened. Since the output of the auxiliary power supply unit is not enabled, although the first power selection switch SW1 is closed, the path will not provide power to the load.

Figure 5:
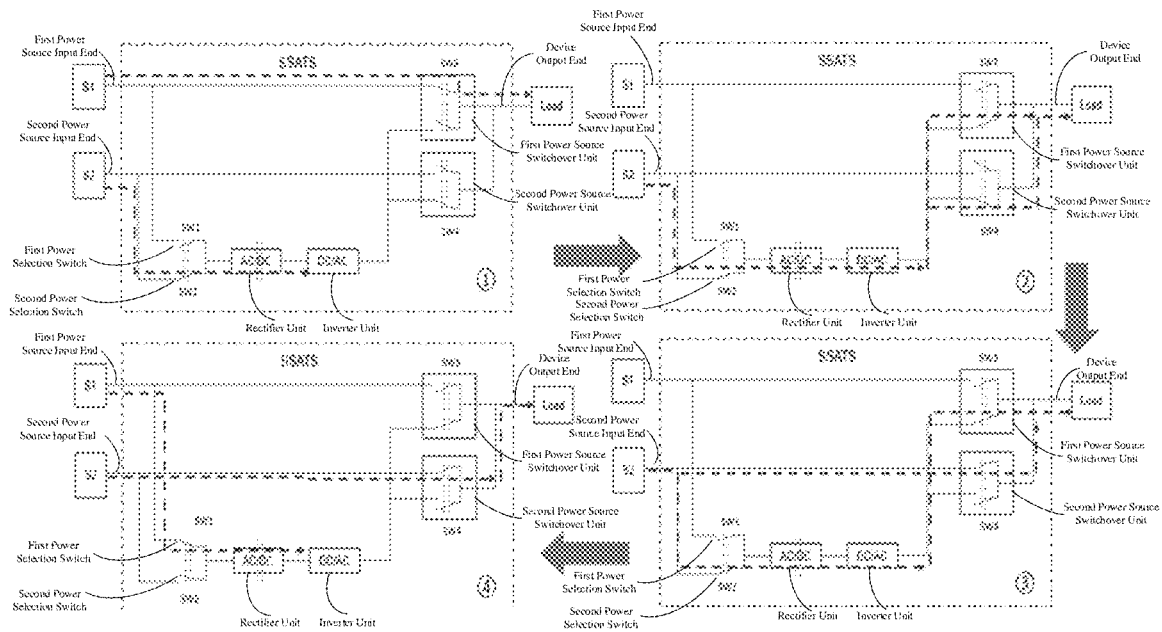
FIG. 5 shows a switchover flowchart of a power source automatic transfer device according to an embodiment of the present disclosure.
Figure 6:
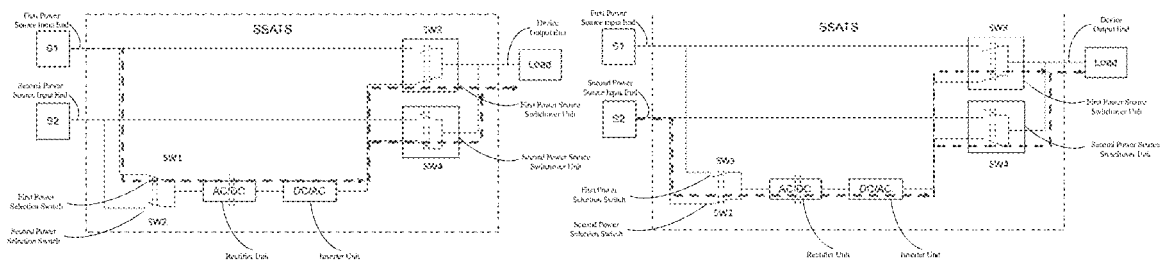
FIG. 6 shows an operating mode in which an auxiliary power supply unit of the power source automatic transfer device according to an embodiment of the present disclosure provides power.

FIG. 5 shows a process of switching to the second source S2 via the auxiliary power supply unit (shown as including a rectifier unit AC/DC and an inverter unit DC/AC) when the first power source S1 fails.

The four diagrams in FIG. 5 show control flows across respective internal functional modules. In respective control flows, the power source switchover device controls respective components via the control unit according to results of the detection by the detection unit for the first power source and the second power source.

Diagram ① in FIG. 5 shows a situation where power is supplied by the first power source S1. Specifically, the first input end of the first power source switchover switch SW3 connected with the first power source is closed, that is, the first power source S1 can directly supplies power to the load. At this time, the first input end of the second power source switchover switch SW4 connected with the second power source S2 is opened, that is, the second power source S2 cannot supply power to the load. Since the output of the auxiliary power supply unit is not enabled, although the second input end of the second power source switchover switch SW4 connected with the second power source S2 via the auxiliary power supply unit is closed, the path will not supply power to the load. Moreover, meanwhile, the first power selection switch SW1 of the auxiliary power supply unit is closed, whereas the second power selection switch SW2 is opened. Since the output of the auxiliary power supply unit is not enabled, although the second power selection switch SW2 is closed, the path will not provide power to the load.

Diagram ② in FIG. 5 shows a situation where: when the first power source S1 fails, for example, when the detection unit detects that the voltage or current of the first power source does not meet a predetermined condition, the control unit first opens the first input end of the first power source switchover switch SW3 connected with the first power source S1 and closes the second input end first power source switchover switch SW3 connected with the auxiliary power supply unit. At this time, the first power source S1 no longer supplies power to the load, and the second power source S1 supplies power to the load via the auxiliary power supply unit.

Subsequently, the control unit closes the first input end of the second power source switchover switch SW4 connected with the second power source S2, and opens the second input end of the second power source switchover switch SW4 connected with the second power source S2 via the auxiliary power supply unit (as shown by 3 in FIG. 5). At this time, the second power source can directly supply power to the load due to the closure of the first input end of the second power source switchover switch SW4, and at the same time, the second power source can also supply power to the load via the auxiliary power supply unit due to the closure of the second input end of the first power source switchover switch.

Further, the control unit closes the first power selection switch of the auxiliary power supply unit and opens the second power selection switch. In this way, the second power source S2 supplies power to the load via the first input end of the second power source switchover switch, as shown by 4) in FIG. 5. At this time, since the first input end of the first power source switchover switch SW3 connected with the first power source S1 is opened, the first power source S1 cannot directly supply power to the load. In addition, since the output of the auxiliary power supply unit is not enabled, although the second input end of SW3 connected with the auxiliary power supply unit is closed, the path will not provide power to the load. Meanwhile, the first power selection switch SW1 of the auxiliary power supply unit is closed, whereas the second power selection switch SW2 is open. Since the output of the auxiliary power supply unit is not enabled, although the first power selection switch SW1 is closed, the path will not provide power to the load.

In addition to automatically switching between the first power source and the second power source, the power source switchover device according to the embodiment of the present disclosure can further provide a power supply mode for a scenario where a rectified and inverted clean power source is needed, in which the auxiliary power supply unit is used to supply power to the load for a long time. Specifically, both the first power source S1 and the second power source S2 can provide electric energy to the auxiliary power supply unit and supply power to the load via the auxiliary power supply unit for a long time.

When the first power source S1 is used to supply power to the auxiliary power supply unit, the first power selection switch SW1 is closed, the second power selection switch SW2 is opened, the first input end of the first power source switchover switch and the first input end of the second power source switchover switch are opened, and the second input end of the first power source switchover switch and the second input end of the second power source switchover switch are closed, so that the first power source S1 supplies power to the load via the auxiliary power supply unit for a long time.

When the second power source S2 is used to supply power to the auxiliary power supply unit, the first power selection switch SW1 is opened, the second power selection switch SW2 is closed, the first input end of the first power source switchover switch and the first input end of the second power source switchover switch are opened, and the second input end of the first power source switchover switch and the second input end of the second power source switchover switch are closed, so that the second power source S1 supplies power to the load via the auxiliary power supply unit for a long time.

Since the power source switchover device according to the embodiment of the present disclosure introduces two mechanical switches, and implements a switchover between S1 and S2 in two steps (first, the other power source supplies power to the load via the auxiliary power supply unit, and then the other power source supplies power to the load without the auxiliary power supply unit (e.g., directly)), there is no issue of arc discharge between both power sources, and the service life of the switch contacts is longer. In addition, the power source switchover device according to the embodiment of the present disclosure can provide various power supply modes with high transfer efficiency, including a mode in which the auxiliary power supply unit (which may include, for example, a rectifier unit and an inverter unit) supplies power to a load for a long time, for use in a scenario where clean power source is needed. Furthermore, the switch used in this solution has double separated open/close positions, which is convenient for maintenance.

The hardware computing device in whole or the components thereof described in the present disclosure can be implemented by various suitable hardware means, including but not limited to FPGA, ASIC, SoC, discrete gate or transistor logic, discrete hardware component, or any combination thereof.

The block diagrams of circuits, devices, apparatuses, equipment and systems involved in the present disclosure are only illustrative examples, and are not intended to require or imply that they must be connected, arranged and configured in the manner shown in the block diagrams. As will be recognized by those skilled in the art, such circuits, devices, apparatuses, equipment and systems can be connected, arranged and configured in arbitrary way, as long as the desired purpose can be achieved.

It should be understood by those skilled in the art that the above-described specific embodiments are only examples rather than limitations, and various modifications, combinations, partial combinations and substitutions can be made to the embodiments of the present disclosure according to design requirements and other factors, as long as they are within the scope of the appended claims or their equivalents, that is, belong to the scope of rights to be protected by the present disclosure.

What is claimed is:

1. A power source automatic transfer device, comprising:
a first power source input end;
a second power source input end;
an auxiliary power supply unit whose electric energy is acquired from a first power source or a second power source;
a device output end connected to a load;
a power source switchover unit including a control unit and a power source switchover switch, the power source switchover switch including a first power source switchover switch and a second power source switchover switch, wherein a first input end of the first power source switchover switch and a first input end of the second power source switchover switch are respectively connected to the first power source input end and the second power source input end, a second input end of the first power source switchover switch and a second input end of the second power source switchover switch are both connected to an output end of the auxiliary power supply unit, and an output end of the first power source switchover switch and an output end of the second power source switchover switch are connected with the device output end; and a detection unit which is connected to the first power source input end and the second power source input end to detect the first power source and the second power source in real time so as to determine whether the first power source and the second power source fail, wherein in response to the detection unit determining that the first power source does not fail, the control unit controls the first power source to supply power to the load, and in response to the detection unit determining that the first power source fails, the control unit controls the first power source switchover switch to open its first input end connected with the first power source and close its second input end connected with the auxiliary power supply unit, and controls the second power source switchover switch to close its first output end connected with the second power source so as to cause the second power source to supply power to the load and disconnect its second input end connected with the auxiliary power supply unit, so that a transfer is made from supplying power to the load by the first power source to supplying power to the load by the second power source.

2. The power source automatic transfer device according to claim 1, wherein in response to the detection unit determining that a fault of the first power source is eliminated, the control unit controls the second power source switchover switch to open its first input end connected with the second power source and close its second input end connected with the auxiliary power supply unit, and controls the first power source switchover switch to close its first input end connected with the first power source so as to cause the first power source to supply power to the load and open its second input end connected with the auxiliary power supply unit, so that a transfer is made from supplying power to the load by the second power source to supplying power to the load by the first power source.

3. The power source automatic transfer device according to claim 1, wherein the control unit controls the first power source switchover switch, the second power source switchover switch and the auxiliary power supply unit so as to continuously supply power to the load by the first power source or the second power source via the auxiliary power supply unit.

4. The power source automatic transfer device according to claim 1, wherein the auxiliary power supply unit includes a first power selection switch, a second power selection switch, a rectifier unit and an inverter unit, and wherein, an output end of the inverter unit is used as the output end of the auxiliary power supply unit, an input end of the inverter unit is connected to an output end of the rectifier unit, the first power selection switch is connected between the first power source input end and an input end of the rectifier unit, and the second power selection switch is connected between the second power source input and the input end of the rectifier unit;

wherein, the control unit controlling the first power source to supply power to the load comprises controlling to turn off the first power selection switch and turn on the second power selection switch;

wherein, the control unit controlling the second power source to supply power to the load comprises controlling to turn off the second power selection switch and turn on the first power selection switch.

5. The power source automatic transfer device according to claim 1, wherein a control end of the first power source switchover switch and a control end of the second power source switchover switch are connected with the control unit.

6. The power source automatic transfer device according to claim 1, wherein the first power source and the second power source are Alternating Current power sources.

7. The power source automatic transfer device according to claim 1, wherein both the first power source switchover switch and the second power source switchover switch are double-pole double-throw switches.

* * * * *